United States Patent
Liu et al.

(10) Patent No.: US 12,036,557 B2
(45) Date of Patent: Jul. 16, 2024

(54) MICROFLUIDIC SUBSTRATE, MICROFLUIDIC CHIP AND DETECTION METHOD THEREOF

(71) Applicant: BOE TECHNOLOGY GROUP CO., LTD., Beijing (CN)

(72) Inventors: Yingming Liu, Beijing (CN); Haisheng Wang, Beijing (CN); Xiaoliang Ding, Beijing (CN); Lei Wang, Beijing (CN); Pengpeng Wang, Beijing (CN); Yunke Qin, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 812 days.

(21) Appl. No.: 17/272,119

(22) PCT Filed: May 11, 2020

(86) PCT No.: PCT/CN2020/089554
§ 371 (c)(1),
(2) Date: Feb. 26, 2021

(87) PCT Pub. No.: WO2020/228658
PCT Pub. Date: Nov. 19, 2020

(65) Prior Publication Data
US 2021/0339255 A1    Nov. 4, 2021

(30) Foreign Application Priority Data

May 13, 2019    (CN) ............................ 201910400231

(51) Int. Cl.
*B01L 3/00*    (2006.01)
*G01N 21/47*    (2006.01)
(Continued)

(52) U.S. Cl.
CPC ........ *B01L 3/502792* (2013.01); *G01N 21/47* (2013.01); *G01S 15/04* (2013.01);
(Continued)

(58) Field of Classification Search
None
See application file for complete search history.

(56) References Cited

U.S. PATENT DOCUMENTS

| 2006/0078473 | A1* | 4/2006 | Murakami | ............ F04B 19/006 422/400 |
| 2013/0168250 | A1* | 7/2013 | Fogleman | ............ C12Q 1/6825 204/549 |
| 2014/0339318 | A1 | 11/2014 | Shadpour et al. | |
| 2020/0108387 | A1* | 4/2020 | Dong | .................. G01N 21/645 |

FOREIGN PATENT DOCUMENTS

| CN | 107607475 A | * 1/2018 | ........ B01L 3/502715 |
| CN | 108169966 A | 6/2018 | |

(Continued)

OTHER PUBLICATIONS

First Office Action of the Search Report issued on May 8, 2020 for application No. CN201910400231.4 with English translation attached.
(Continued)

*Primary Examiner* — Samuel P Siefke
*Assistant Examiner* — Henry H Nguyen
(74) *Attorney, Agent, or Firm* — Nath, Goldberg & Meyer; Joshua B. Goldberg

(57) ABSTRACT

The present disclosure provides a microfluidic substrate, a microfluidic chip and a detection method. The microfluidic substrate according to the present disclosure includes a first substrate, and a plurality of droplet detecting elements on the first substrate and in an array. Each of the plurality of droplet detecting elements includes an ultrasonic conversion device and a voltage detecting element, the ultrasonic conversion device is configured to generate ultrasonic wave according (Continued)

to a first electric signal, receive a reflected ultrasonic wave, and convert the reflected ultrasonic wave into a second electric signal; and the voltage detecting element is configured to detect the second electric signal and determine whether a droplet exists at a position where the droplet detecting element is located based on the second electric signal.

13 Claims, 3 Drawing Sheets

(51) Int. Cl.
*G01S 15/04* (2006.01)
*G01S 15/06* (2006.01)

(52) U.S. Cl.
CPC ....... *G01S 15/06* (2013.01); *B01L 2300/0645* (2013.01); *B01L 2300/0861* (2013.01); *B01L 2300/168* (2013.01); *B01L 2400/0439* (2013.01)

(56) References Cited

FOREIGN PATENT DOCUMENTS

| CN | 108355728 A | 8/2018 |
| CN | 108704682 A | 10/2018 |
| CN | 108760644 A | 11/2018 |
| CN | 108816299 A | 11/2018 |
| CN | 110124759 A | 8/2019 |

OTHER PUBLICATIONS

Second Office Action of the Search Report issued on Dec. 30, 2020 for application No. CN201910400231.4 with English translation attached.

Rejection issued on Jul. 2, 2021 for application No. CN201910400231.4 with English translation attached.

Qin Renjia et al., Section 5 Ultrasound and Infrasound, "Medical Physics", Guangxi Normal University Press, Jul. 1990, p. 75., with English translation.

* cited by examiner

MICROFLUIDIC SUBSTRATE, MICROFLUIDIC CHIP AND DETECTION METHOD THEREOF

CROSS REFERENCE TO RELATED APPLICATION

This is a National Phase Application filed under 35 U.S.C. 371 as a national stage of PCT/CN2020/089554, filed on May 11, 2020, an application claiming priority to Chinese patent application No. 201910400231.4, filed on May 13, 2019, the disclosure of which is incorporated herein by reference.

TECHNICAL FIELD

The present disclosure belongs to the field of microfluidic technology, and particularly relates to a microfluidic substrate, a microfluidic chip, and a detection method of the microfluidic chip.

BACKGROUND

The microfluidic technology can integrate basic operation elements used for sample preparation, reaction, separation, detection and the like in the process of biological, chemical and medical analysis into a micron-scale chip to automatically complete micro-total analysis, and has shown excellent development prospect in the field of biology, chemistry, medicine and the like due to the advantages of cost reduction, short detection time, high sensitivity and the like.

SUMMARY

In one aspect, the present disclosure provides a microfluidic substrate including a first substrate, and a plurality of droplet detecting elements on the first substrate that are arranged in an array, wherein each of the plurality of droplet detecting elements includes an ultrasonic conversion device and a voltage detecting element, the ultrasonic conversion device is configured to generate ultrasonic wave according to a first electric signal, receive a reflected ultrasonic wave, and convert the reflected ultrasonic wave into a second electric signal; and the voltage detecting element is configured to detect the second electric signal and determine whether a droplet exists at a position of the droplet detecting element based on the second electric signal.

In an embodiment, the ultrasonic conversion device includes a first electrode, a piezoelectric structure, and a second electrode sequentially stacked, the second electrode being electrically coupled to the voltage detecting element.

In an embodiment, each of the plurality of droplet detecting elements further includes a first switch element and a second switch element;

the first switch element is configured to control connection/disconnection between a first driving signal terminal and the first electrode according to a signal of a first gate control signal terminal; and the second switch element is configured to control connection/disconnection between a second driving signal terminal and the second electrode according to a signal of a second gate control signal terminal.

In an embodiment, at least one of the plurality of droplet detecting elements further includes a photodiode, an anode of the photodiode is coupled to the second driving signal terminal, and a cathode of the photodiode is coupled to the second electrode.

In an embodiment, the microfluidic substrate further includes a first light shielding layer on a side of the first substrate away from the droplet detecting element.

In an embodiment, the voltage detecting element includes: a third transistor, a fourth transistor and a first resistor, a gate electrode of the third transistor is coupled to the second electrode, and a first electrode and a second electrode of the third transistor are respectively coupled to a power supply and a first electrode of the fourth transistor, a gate electrode of the fourth transistor is coupled to a third gate control signal terminal, and a second electrode of the fourth transistor is coupled to an output terminal and one terminal of the first resistor, and the other terminal of the first resistor is grounded.

In an embodiment, the first electrode further serves as a droplet driving electrode configured to drive the droplet to move.

In another aspect, the present disclosure provides a microfluidic chip including:

the microfluidic substrate according to an embodiment of the present disclosure, and a counter substrate opposite to the microfluidic substrate, a channel for the droplet to move is defined between the counter substrate and the microfluidic substrate, and the counter substrate is on a side of the first substrate facing the droplet detecting element.

In an embodiment, the microfluidic substrate is the microfluidic substrate according to an embodiment, and the counter substrate includes a second substrate and an optical waveguide structure on a side of the second substrate facing the first substrate.

In an embodiment, the counter substrate further includes a second light shielding layer on a side of the second substrate away from the first substrate.

In an embodiment, the optical waveguide structure has a plurality of light outlets on a side optical waveguide structure facing the microfluidic substrate, and an orthographic projection of each of the plurality of light outlets on the first substrate at least partially overlaps with an orthographic projection of a corresponding one of the plurality of droplet detecting elements on the first substrate.

In an embodiment, the orthographic projection of each of the plurality of light outlets on the first substrate at least partially overlaps an orthographic projection of a corresponding one of the photodiodes on the first substrate.

In another aspect, the present disclosure provides a detection method for a microfluidic chip, which is applied to the microfluidic chip according to an embodiment of the present disclosure, the detection method including:

controlling each ultrasonic conversion device in a to-be-detected region to generate ultrasonic wave according to the first electric signal;

detecting the reflected ultrasonic wave and converting the reflected ultrasonic wave into the second electric signal by each ultrasonic conversion device in the to-be-detected region; and determining a position of the droplet according to an intensity distribution of the second electrical signal.

In an embodiment, the controlling each ultrasonic conversion device in the to-be-detected region to generate ultrasonic wave according to the first electric signal includes: providing an effective voltage to the first gate control signal terminal and the second gate control signal terminal, providing a square-wave voltage to the first driving signal terminal, and providing a fixed voltage to the second driving signal terminal;

the detecting the reflected ultrasonic wave and converting the reflected ultrasonic wave into the second electric signal by each ultrasonic conversion device in the to-be-detected region includes: providing an effective voltage to the first gate control signal terminal, providing an ineffective voltage to the second gate control signal terminal, and providing a fixed low-level voltage to the first driving signal terminal;

the determining the position of the droplet according to the intensity distribution of the second electric signal includes determining the position of the droplet according to distributions of voltages of the second electric signals detected by respective voltage detecting elements in the to-be-detected region.

In an embodiment, the detection method further includes:

moving the droplet to a position directly facing a light outlet of the optical waveguide structure;

providing incident light to the optical waveguide structure to emit light having a first wavelength at the light outlet of the optical waveguide structure, and providing an ineffective voltage to both the first gate control signal terminal and the second gate control signal terminal;

acquiring a voltage of a third electric signal detected by a detecting element at a position of the droplet; and determining concentration information of the droplet according to the voltage of the third electric signal detected by the detecting element at the position of the droplet.

DETAILED DESCRIPTION

To make those skilled in the art better understand the technical solutions of the present disclosure, the present disclosure will be further described in detail with reference to the accompanying drawings and the specific embodiments.

In a case where a traditional microfluidic chip detects a position of a droplet in the traditional microfluidic chip, the adopted method includes the following steps: controlling a backlight below a lower substrate to emit uniform light towards the microfluidic chip; reflecting the light back by an upper substrate of the microfluidic chip; detecting, by an optical detecting device above the lower substrate, an intensity of the light reflected back. For a position with a droplet and a position without a droplet, the intensities of the light detected by the optical detecting devices at corresponding positions are different. By analyzing these intensity data, the position of the droplet may be determined. For the microfluidic chip applying the detection method, a backlight below the lower substrate is required, and therefore the microfluidic system has a complex structure.

Figure 1:
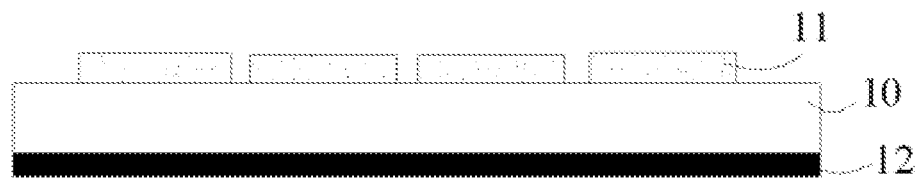
FIG. 1 is a schematic structural diagram of a microfluidic substrate according to an embodiment of the present disclosure.

Referring to FIG. 1, the present embodiment provides a microfluidic substrate including a first substrate 10, and droplet detecting elements 11 disposed on the first substrate 10 and distributed in an array. The droplet detecting element 11 includes a droplet driving electrode 115 and an ultrasonic conversion device 111, and the ultrasonic conversion device 111 is configured to emit ultrasonic wave and detect a reflected ultrasonic wave to determine whether a droplet L exists at a position corresponding to the droplet driving electrode 115.

Figure 3:
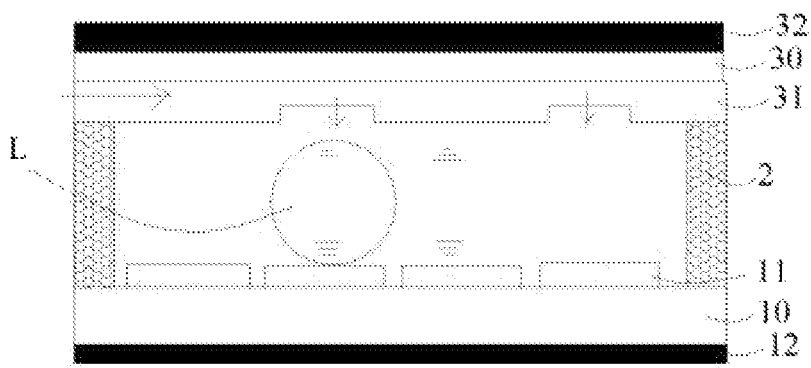
FIG. 3 is a schematic structural diagram of a microfluidic chip according to an embodiment of the present disclosure.

That is, the ultrasonic wave is emitted and the reflected ultrasonic wave is detected by the ultrasonic conversion device 111. Referring to FIG. 3, when the microfluidic substrate is applied to a microfluidic chip, ultrasonic wave (indicated by three continuous transverse lines wide at the top and narrow at the bottom in FIG. 3) emitted from the ultrasonic conversion device 111 is reflected by a counter substrate which is assembled with the microfluidic substrate. The intensities of the ultrasonic wave (indicated by three continuous transverse lines or two continuous transverse lines wide at the bottom and narrow at the top in FIG. 3) reaching the ultrasonic conversion device 111 are different for the position where the droplet L is present and the position where the droplet L is absent. The position of the droplet L may be estimated by reading the intensity of the ultrasonic wave received by the ultrasonic conversion device 111 of each droplet detecting element 11 and analyzing the distribution of the intensity information.

Figure 4:
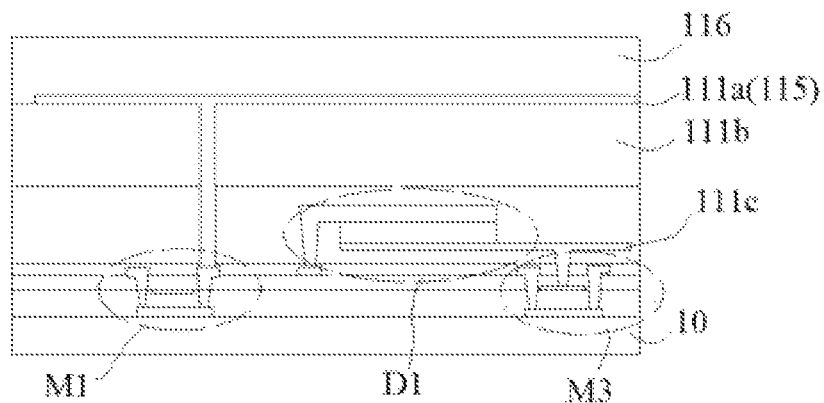
FIG. 4 is a cross-sectional view of a microfluidic substrate according to an embodiment of the present disclosure.

In combination with FIG. 4, after the microfluidic substrate is fabricated, the positional relationship between the droplet driving electrode 115 and the ultrasonic conversion device 111 is determined. In an embodiment, an orthographic projection of the droplet driving electrode 115 on the first substrate at least partially overlaps with an orthographic projection of the ultrasonic conversion device 111 on the first substrate. The microfluidic substrate includes a plurality of droplet driving electrodes 115 (typically arranged in an array). By applying different voltages to different droplet driving electrodes 115, the purpose of controlling the movement of the droplet L is achieved. In practical applications, the droplet L usually needs to stop at a position corresponding to one of the droplet driving electrodes 115, and thus, it can be determined whether or not the droplet L is present at the position corresponding to the one of the droplet driving electrodes 115 by the analysis described above.

Figure 2:
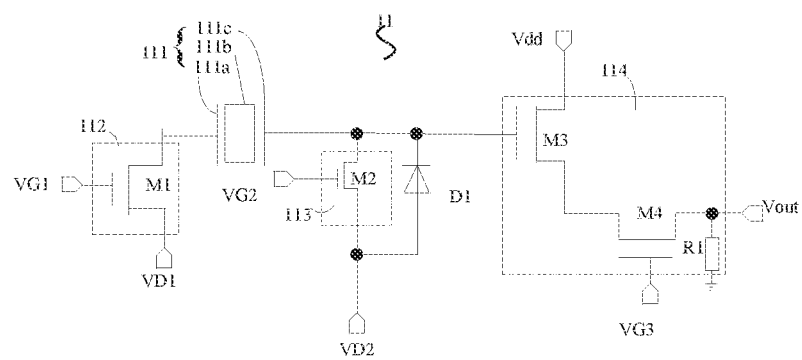
FIG. 2 is a circuit diagram of a detecting element shown in FIG. 1.

In an embodiment, as shown in FIG. 2, the ultrasonic conversion device 111 includes a first electrode 111a, a piezoelectric structure 111b, and a second electrode 111c sequentially stacked. That is, the piezoelectric structure 111b generates a potential difference between both terminals under pressure, and can realize the conversion between the mechanical vibration and the alternating current, and thus the piezoelectric structure may be applied to transmit and receive the ultrasonic wave. Of course, other means of transmitting and receiving ultrasonic wave may be used by those skilled in the art.

In an embodiment, the microfluidic substrate further includes voltage detecting elements 114. The ultrasonic conversion device 111 is configured to: generate ultrasonic wave according to a first electrical signal, receive the reflected ultrasonic wave, and convert the reflected ultrasonic wave into a second electrical signal. The voltage detecting element 114 is configured to detect the second electric signal and determine, based on the second electric signal, whether or not a droplet exists at a position where the droplet detecting element 11 is located.

In an embodiment, the first electrode 111a may serve as the droplet driving electrode 115.

In an embodiment, the droplet detecting element 11 further includes a first switch element 112 and a second switch element 113. The first switch element 112 is configured to control connection/disconnection between a first driving signal terminal VD1 and the first electrode 111a according to a signal of a first gate control signal terminal VG1; the second switch element 113 is configured to control connection/disconnection between a second driving signal terminal VD2 and the second electrode 111c according to a signal of a second gate control signal terminal VG2; and the voltage detecting element 114 is configured to detect a voltage of the second electrode 111c.

The first driving signal terminal VD1 is configured to write a voltage to the first electrode 111a. The first gate control signal terminal VG1 controls the connection/disconnection between the first driving signal terminal VD1 and the first electrode 111a. In an embodiment, the first switch element 112 includes a first transistor M1 having a gate electrode coupled to the first gate control signal terminal VG1 and the remaining two electrodes coupled to the first driving signal terminal VD1 and the first electrode 111a, respectively.

The second driving signal terminal VD2 is configured to write a voltage to the second electrode 111c. The second gate control signal terminal VG2 controls the connection/disconnection between the second driving signal terminal VD2 and the second electrode 111c. In an embodiment, the second switch element 113 includes a second transistor M2 having a gate electrode coupled to the second gate control signal terminal VG2 and the remaining two electrodes coupled to the second driving signal terminal VD2 and the second electrode 111c, respectively.

In order to transmit the ultrasonic wave, an effective voltage may be provided to both the first gate control signal terminal VG1 and the second gate control signal terminal VG2 to turn on the first transistor M1 and the second transistor M2. The piezoelectric structure 111b emits ultrasonic wave by applying a high-frequency voltage (e.g., a high-frequency square wave voltage) between the first driving signal terminal VD1 and the second driving signal terminal VD2. In order to receive the ultrasonic wave, a fixed voltage is applied to the first electrode 111a, and the characteristics of the received ultrasonic wave may be reflected by reading the voltage change of the second electrode 111c. The voltage of the second electrode 111c is read by the voltage detecting element 114.

In an embodiment, the voltage detecting element 114 includes a third transistor M3, a fourth transistor M4, and a first resistor R1. A gate electrode of the third transistor M3 is coupled to the second electrode 111c, and the remaining two electrodes of the third transistor M3 are coupled to the power supply Vdd and a first electrode of the fourth transistor M4, respectively. A gate electrode of the fourth transistor M4 is coupled to a third gate control signal terminal VG3, and a second electrode of the fourth transistor M4 is coupled to an output terminal Vout and one terminal of the first resistor R1. The other terminal of the first resistor R1 is coupled to ground. The third gate control signal terminal VG3 is configured to control the connection/disconnection of the path from the power supply Vdd to the ground through the third transistor M3, the fourth transistor M4 and the first resistor RE Since the third transistor M3, the fourth transistor M4, and the first resistor R1 are equivalent to three resistors coupled in series, the difference in the voltage of the second electrode 111c will cause the difference in the conduction degree of the third transistor M3, and further affect the value of the voltage of the second electrode of the fourth transistor M4. The voltage of the output terminal Vout to which the second electrode of the fourth transistor M4 is coupled may be read by a voltage detecting circuit (not shown) provided on the microfluidic substrate or an external voltage detecting circuit.

In an embodiment, the droplet detecting element 11 may further include a photodiode D1, an anode of the photodiode D1 is coupled to the second driving signal terminal VD2, and a cathode of the photodiode D1 is coupled to the second electrode 111c. The function of the photodiode D1 is to reflect the richer information of the droplet L by reading the information of light. For example, as shown in FIG. 3, in a case where the microfluidic substrate and a counter substrate are assembled to form the microfluidic chip, an optical waveguide structure 31 is provided on a side of the counter substrate facing the microfluidic substrate. The optical waveguide structure 31 converts, at a specified position, a part of light having a specific wavelength among light emitted from one side of the optical waveguide structure 31 (indicated by an arrow pointing to the right in FIG. 3) to emit toward the microfluidic substrate. The intensity information of the light irradiated onto the photodiode D1 may also be read by the voltage detecting element 114. At this time, the first electrode 111a and the first driving signal terminal VD1 are disconnected, and the second electrode 111c and the second driving signal terminal VD2 are disconnected by the first gate control signal terminal VG1 and the second gate control signal terminal VG2. Thus, when light is irradiated onto the photodiode D1 through a droplet, a photocurrent generated by the photodiode D1 may be read by the voltage detecting element 114. It should be understood that the magnitude of the photocurrent may be related to the concentration of the droplet. Therefore, the concentration information of the droplet may be obtained from the measurement result of the voltage detecting element.

In an embodiment, the microfluidic substrate further includes a first light shielding layer 12 disposed on a side of the first substrate 10 away from the droplet detecting element 11. That is, if the photodiode D1 is required to detect the intensity information of the light passing through the droplet L, the first light shielding layer 12 may be disposed on a side of the first substrate 10 away from the droplet detecting element 11, so as to avoid the interference of the ambient light on the photodiode D1 from the side of the first substrate 10. Of course, if the microfluidic substrate is only required to determine the position of the droplet L, the photodiode D1 does not need to be provided in the droplet detecting element 11, and the first light shielding layer 12 may not be needed.

In the embodiment shown in FIG. 4, the droplet driving electrode 115 also serves as the first electrode 111a, and is formed of, for example, an Indium Tin Oxide (ITO) electrode. The second electrode 111c, the cathode of the photodiode D1, and the gate electrode of the third transistor are formed of the same ITO electrode.

It should be noted that other structures of the microfluidic substrate may be fabricated according to conventional designs. For example, a teflon material and/or a resin material is disposed on the uppermost layer of the microfluidic substrate as a planarization layer 116. The planarization layer 116 has a function of planarization.

It should be noted that, in the above examples, each ultrasonic conversion device 111 includes one piezoelectric structure 111b. However each ultrasonic conversion device 111 may include two piezoelectric structures 111b (two first electrodes 111a and two second electrodes 111c are provided correspondingly), one piezoelectric structure 111b is configured to transmit ultrasonic wave, the other piezoelectric structure 111b is configured to receive ultrasonic wave, and the two piezoelectric structures are arranged in pairs.

As shown in FIG. 3, an embodiment of the present disclosure provides a microfluidic chip, which includes the microfluidic substrate as described above, and further includes a counter substrate disposed opposite to the microfluidic substrate, a channel for moving the droplet L is defined between the counter substrate and the microfluidic substrate, and the counter substrate is located on a side of the first substrate 10 facing the droplet detecting element 11. The boundary of the channel may be defined by an encapsulation structure 2, and the material of the encapsulation structure 2 is, for example, a sealant.

Therefore, the position information of the droplet L in the microfluidic chip can be detected without a backlight, and the structure of the microfluidic chip is simplified.

In the embodiment, in a case where the droplet detecting element 11 further includes the photodiode D1, the counter substrate includes a second substrate 30, an optical waveguide structure 31 provided on a side of the second substrate 30 facing the first substrate 10. In an embodiment, the optical waveguide structure 31 has a plurality of light outlets on a side facing the microfluidic substrate, and an orthographic projection of each of the plurality of light outlets on the first substrate at least partially overlaps with an orthographic projection of a corresponding one of the plurality of droplet detecting elements 11 on the first substrate. The optical waveguide structure 31 performs a function of emitting light having a wavelength in a specified wavelength range from a specified position (i.e., light outlet) toward the first substrate 10.

In an embodiment, the orthogonal projection of each of the plurality of light outlets on the first substrate at least partially overlaps an orthogonal projection of a corresponding one of the photodiodes D1 on the first substrate, thereby ensuring that the light emitted from the light outlet is irradiated on the photodiode D1.

In an embodiment, the counter substrate further includes a second light shielding layer 32 disposed on a side of the second substrate 30 away from the first substrate 10. The second light shielding layer 32 functions to prevent interference of ambient light.

Of course, both the first light shielding layer 12 and the second light shielding layer 32 may be implemented by a dark room structure external to the microfluidic chip.

Figure 5:
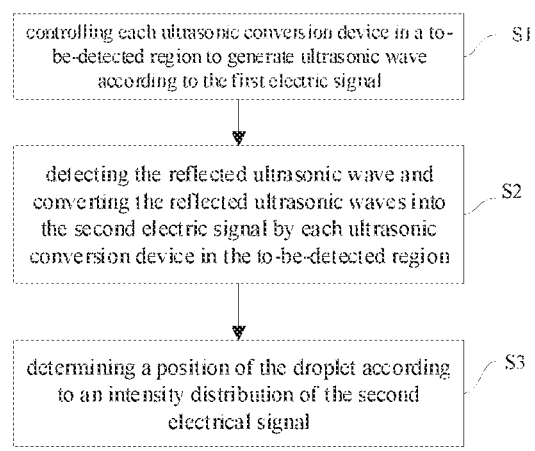
FIG. 5 is a flow chart of a detect method for a microfluidic chip according to an embodiment of the present disclosure.

Referring to FIG. 5 in combination with FIG. 3, an embodiment of the present disclosure provides a detection method for a microfluidic chip, which is applied to the microfluidic chips of above embodiments, and the detection method includes steps S1 to S3.

In step S1, each ultrasonic conversion device 111 in the to-be-detected region is controlled to generate ultrasonic wave according to the first electric signal. The to-be-detected region may be a region of the entire channel or may be a partial region of the channel. Design is required to make the ultrasonic wave emitted from the to-be-detected region as uniform as possible.

In step S2, the reflected ultrasonic wave is detected and converted into a second electrical signal by each ultrasonic conversion device 111 within the to-be-detected region. The intensity of the ultrasonic wave reaching the ultrasonic conversion device 111 in the case where there is a droplet L at a certain position is different from that in the case where there is no droplet L at the certain position.

After the reception of the ultrasonic wave is completed, in step S3, the position of the droplet L is determined according to the intensity distribution of the second electric signal.

The transmission, reception, and detection of the ultrasonic wave may be performed at any desired timing, for example, during the movement of the droplet L or after the droplet L stops moving. Of course, how the movement of the droplet L is controlled is not limited in the present disclosure.

In an embodiment, in the case where the droplet detecting element 11 further includes the first switch element 112, the second switch element 113, and the voltage detecting element 114, the controlling each ultrasonic conversion device 111 in the to-be-detected region to generate the ultrasonic wave according to the first electric signal includes: providing an effective voltage to the first gate control signal terminal VG1 and the second gate control signal terminal VG2, providing a square-wave voltage to the first driving signal terminal VD1, and providing a fixed voltage to the second driving signal terminal VD 2; the detecting the reflected ultrasonic wave and converting the reflected ultrasonic wave into the second electric signal by each ultrasonic conversion device 111 in the to-be-detected region includes: providing an effective voltage to the first gate control signal terminal VG1, providing an ineffective voltage to the second gate control signal terminal VG2, and providing a fixed low-level voltage to the first driving signal terminal VD1; the determining the position of the droplet according to the intensity distribution of the second electric signal includes: determining the position of the droplet L according to distribution of the voltages of the second electric signals detected by respective voltage detecting elements 114 in the to-be-detected region.

That is, the ultrasonic wave is emitted by applying a high-voltage square wave between the first electrode 111a and the second electrode 111c, and is received by applying a fixed voltage to the first electrode 111a and detecting a voltage of the second electric signal. The position of the droplet L is determined by the distribution of the voltages of the second electric signals of the second electrodes 111c at different positions.

Figure 6:
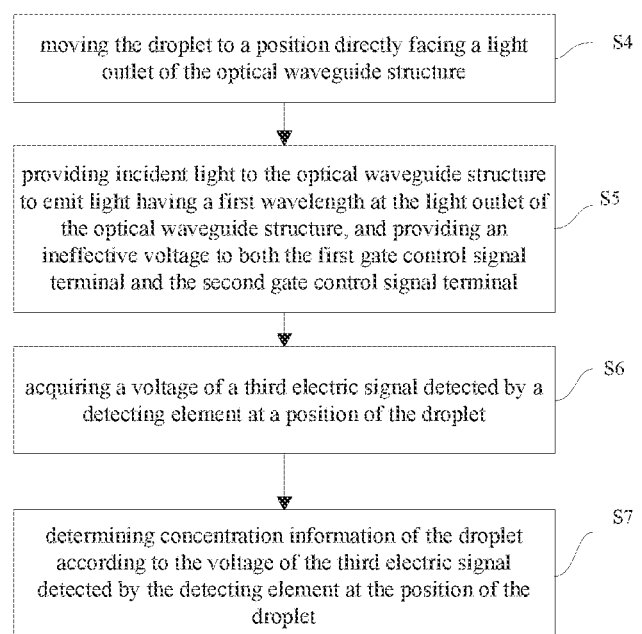
FIG. 6 is a flow chart of another detection method for a microfluidic chip according to an embodiment of the present disclosure.

In an embodiment, referring to FIG. 6 in combination with FIGS. 2 and 3, in a case where the counter substrate includes the second substrate 30 and the optical waveguide structure 31 disposed on a side of the second substrate 30 facing the first substrate 10, the detection method further includes the following steps:

In step S4, the droplet L is moved to a position directly facing the light outlet of the optical waveguide structure 31.

In step S5, incident light is provided to the optical waveguide structure 31 to emit light having a specific wavelength at the light outlet thereof, and an ineffective voltage is provided to both the first gate control signal terminal VG1 and the second gate control signal terminal VG2.

In step S6, the voltage output by the voltage detecting element 114 of the detecting element at the position of the droplet L is acquired.

In step S7, the concentration information of the droplet L is determined according to the voltage output from the voltage detecting element 114 of the detecting element at the position of the droplet L.

It is understood that, since the cathode of the photodiode D1 is electrically coupled to the input terminal of the voltage detecting element 114, the voltage output from the voltage detecting element 114 is related to the photocurrent generated by the photodiode D1 under different illumination intensities.

The relationship between the voltage output from the voltage detecting element 114 and the concentration information of the droplet L may be determined in advance by an experimental method.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. A microfluidic substrate, comprising a first substrate, and a plurality of droplet detecting elements on the first substrate and in an array, wherein
    each of the plurality of droplet detecting elements comprises an ultrasonic conversion device and a voltage detecting element,
    the ultrasonic conversion device is configured to generate ultrasonic wave according to a first electric signal, receive a reflected ultrasonic wave, and convert the reflected ultrasonic wave into a second electric signal; and
    the voltage detecting element is configured to detect the second electric signal and determine whether a droplet exists at a position of the droplet detecting element based on the second electric signal;
    wherein the ultrasonic conversion device comprises a first electrode, a piezoelectric structure, and a second electrode sequentially stacked, the second electrode being electrically coupled to the voltage detecting element; and wherein
    the voltage detecting element comprises: a third transistor, a fourth transistor and a first resistor,
    a gate electrode of the third transistor is coupled to the second electrode, and a first electrode and a second electrode of the third transistor are respectively coupled to a power supply and a first electrode of the fourth transistor,
    a gate electrode of the fourth transistor is coupled to a third gate control signal terminal, and a second electrode of the fourth transistor is coupled to an output terminal and one terminal of the first resistor, and
    the other terminal of the first resistor is grounded.

2. The microfluidic substrate of claim 1, wherein each of the plurality of droplet detecting elements further comprises a first switch element and a second switch element;
    the first switch element is configured to control connection/disconnection between a first driving signal terminal and the first electrode according to a signal of a first gate control signal terminal; and
    the second switch element is configured to control connection/disconnection between a second driving signal terminal and the second electrode according to a signal of a second gate control signal terminal.

3. The microfluidic substrate of claim 2, wherein at least one of the plurality of droplet detecting elements further comprises a photodiode, an anode of the photodiode is coupled to the second driving signal terminal, and a cathode of the photodiode is coupled to the second electrode.

4. The microfluidic substrate of claim 3, further comprising a first light shielding layer on a side of the first substrate away from the droplet detecting element.

5. The microfluidic substrate of claim 1, wherein the first electrode further serves as a droplet driving electrode configured to drive the droplet to move.

6. A microfluidic chip comprising:
    the microfluidic substrate according to claim 1, and
    a counter substrate opposite to the microfluidic substrate, a channel for the droplet to move is defined between the counter substrate and the microfluidic substrate, and the counter substrate is on a side of the first substrate facing the droplet detecting element.

7. The microfluidic substrate of claim 6, wherein
    at least one of the plurality of droplet detecting elements further comprises a photodiode, an anode of the photodiode is coupled to the second driving signal terminal, and a cathode of the photodiode is coupled to the second electrode, and
    the counter substrate comprises a second substrate and an optical waveguide structure on a side of the second substrate facing the first substrate.

8. The microfluidic substrate of claim 7, wherein the counter substrate further comprises a second light shielding layer on a side of the second substrate away from the first substrate.

9. The microfluidic substrate of claim 7, wherein the optical waveguide structure has a plurality of light outlets on a side of the optical waveguide structure facing the microfluidic substrate, and an orthographic projection of each of the plurality of light outlets on the first substrate at least partially overlaps with an orthographic projection of a corresponding one of the plurality of droplet detecting elements on the first substrate.

10. The microfluidic substrate of claim 9, wherein the orthographic projection of each of the plurality of light outlets on the first substrate at least partially overlaps an orthographic projection of a corresponding one of the photodiodes on the first substrate.

11. A detection method for a microfluidic chip, applied to the microfluidic chip of claim 6, the detection method comprising:
    controlling each ultrasonic conversion device in a to-be-detected region to generate ultrasonic wave according to the first electric signal;
    detecting a reflected ultrasonic wave and converting the reflected ultrasonic wave into a second electric signal by each ultrasonic conversion device in the to-be-detected region; and
    determining a position of the droplet according to an intensity distribution of the second electrical signal.

12. The detection method of claim 11, wherein
    the controlling each ultrasonic conversion device in the to-be-detected region to generate the ultrasonic wave according to the first electric signal comprises: providing an effective voltage to the first gate control signal terminal and the second gate control signal terminal, providing a square-wave voltage to the first driving signal terminal, and providing a fixed voltage to the second driving signal terminal;
    the detecting the reflected ultrasonic wave and converting the reflected ultrasonic waves into the second electric signal by each ultrasonic conversion device in the to-be-detected region comprises: providing an effective voltage to the first gate control signal terminal, providing an ineffective voltage to the second gate control signal terminal, and providing a fixed low-level voltage to the first driving signal terminal; and
    the determining the position of the droplet according to the intensity distribution of the second electric signal comprises determining the position of the droplet according to distribution of voltages of the second electric signals detected by respective voltage detecting elements in the to-be-detected region.

13. The detection method of claim 12 further comprising:
moving the droplet to a position directly facing one of the plurality of light outlets of the optical waveguide structure;
providing incident light to the optical waveguide structure to emit light having a first wavelength at the light outlet of the one optical waveguide structure, and providing an ineffective voltage to both the first gate control signal terminal and the second gate control signal terminal;
acquiring a voltage of a third electric signal detected by a detecting element at a position of the droplet; and
determining concentration information of the droplet according to the voltage of the third electric signal detected by the detecting element at the position of the droplet.

* * * * *